United States Patent
Bergmann et al.

(10) Patent No.: US 11,536,015 B2
(45) Date of Patent: Dec. 27, 2022

(54) SEPARATING TOILET

(71) Applicant: EOOS DESIGN GMBH, Vienna (AT)

(72) Inventors: Martin Bergmann, Vienna (AT);
Gernot Bohmann, Vienna (AT);
Harald Gruendl, Vienna (AT)

(73) Assignee: EOOS DESIGN GMBH, Vienna (AT)

( * ) Notice: Subject to any disclaimer, the term of this patent is extended or adjusted under 35 U.S.C. 154(b) by 43 days.

(21) Appl. No.: 16/981,470

(22) PCT Filed: Feb. 26, 2019

(86) PCT No.: PCT/AT2019/060064
§ 371 (c)(1),
(2) Date: Dec. 17, 2020

(87) PCT Pub. No.: WO2019/178622
PCT Pub. Date: Sep. 26, 2019

(65) Prior Publication Data
US 2021/0140158 A1    May 13, 2021

(30) Foreign Application Priority Data

Mar. 19, 2018 (AT) ................ A50227/2018

(51) Int. Cl.
*E03D 5/014* (2006.01)
(52) U.S. Cl.
CPC .................. *E03D 5/014* (2013.01)

(58) Field of Classification Search
CPC ..................................... E03D 5/014
USPC ............................................. 4/300
See application file for complete search history.

(56) References Cited

U.S. PATENT DOCUMENTS

| 2018/0135284 A1* | 5/2018 | Hurtado Torres | ...... E03D 5/012 |
| 2020/0299946 A1* | 9/2020 | Lee | ........ A47K 13/24 |

FOREIGN PATENT DOCUMENTS

| CN | 204040155 U | 12/2014 |
| DE | 10051280 A1 | 5/2002 |
| JP | 2000001891 A | 1/2000 |
| WO | 2014003686 A1 | 1/2014 |

* cited by examiner

*Primary Examiner* — Huyen D Le
(74) *Attorney, Agent, or Firm* — Lucas & Mercanti, LLP; Klaus P. Stoffel

(57) ABSTRACT

A separating toilet including a pan having a pipe section, which is connected in the outflow region and has vertical side walls at least in certain portions, and having a main discharge line connected downstream of the pipe section. An odor trap is provided between the pipe section and the main discharge line. At least one separate auxiliary discharge line for separating urine is provided. The inlet opening of the auxiliary discharge line is arranged on a side of the vertical side wall of the pipe section and thus below the pan and above the odor trap.

9 Claims, 3 Drawing Sheets

SEPARATING TOILET

CROSS-REFERENCE TO RELATED APPLICATIONS

The present application is a 371 of International application PCT/AT2019/060064, filed Feb. 26, 2019, which claims priority of AT A50227/2018, filed Mar. 19, 2018, the priority of these applications is hereby claimed, and these applications are incorporated herein by reference.

BACKGROUND OF THE INVENTION

Technical Field

The invention relates to a separation toilet comprising a bowl having a pipe section which is connected to an outflow region of the bowl and which pipe section has side walls that are at least partially vertical, and having a main outlet which is connected downstream of the pipe section, wherein an odour seal is provided between the pipe section and the main outlet, and wherein at least one separate secondary outlet for the separation of urine is provided.

State of the Art

Regarding separation toilets, the aim is to separate the majority of faeces and urine and optionally the flushing water from one another, so that the individual components can be further processed independently of one another. Especially in developing countries, the disposal of human excretions poses a big environmental problem because of the pollution of the ground and of the bodies of water. Separation toilets make it easier to provide the individual components for further utilization, for example as fertilizer, without the need for a complex sewage and wastewater treatment system. The separation toilets commonly used are mostly systems which have a main outlet for faeces and a secondary outlet for urine, wherein both outlets are usually arranged at respective outflow regions of a toilet bowl and wherein the bowl has a dividing wall or a central barrier in order to separate the two regions from one another. These devices therefore require a certain discipline from the user during use, since the user has to place himself/herself correctly in order to target the respective outflow regions. Especially as is the case with children, the problem arises that they can hardly use toilets standardized for adults correctly, so that as a consequence either faeces or urine gets into the wrong outlet.

Even in industrialized countries attempts are being made to increase the use of separation toilets, in order to make it possible to process the excretions economically and environmentally friendly. In order to further separation toilet systems at all, additional aspects such as comfort and ease of cleaning of the toilet must be taken into account. Systems which are too complicated to install, to use or to clean have practically no chance to be accepted by the market. An example of a very complex separation toilet is one produced by the company Rödinger. In addition to a specially shaped bowl like the ones mentioned above, a complicated valve control mechanism is provided, which opens a valve for the discharge of urine when the pressure of the user on the toilet seat is registered. This device is thus complex in construction, error-prone and high-maintenance.

The patent application JP 2000 001891 A also shows a separation toilet having a complicated design and having the disadvantages described above. On the one hand the opening for the urine outlet is positioned at the bottom of the bowl and requires a correct "targeting" by the user. On the other hand an additional flushing water outlet is disclosed wherein the inlet opening lies above an odour seal formed by a closing flap. The flushing water outlet also leads in the direction of the urine outlet. The separation between flushing water and urine takes place via a valve control mechanism within the urine outlet, which makes the design of the toilet more complicated.

A separation dry-toilet constructed as simple as possible is the so-called Otji toilet (otjtoilet.org). This separation toilet has an annular groove in the side walls located downstream of an outlet pipe section, wherein urine is diverted via the surface tension along the side walls into this groove and subsequently into a secondary outlet. This toilet, which was designed for developing countries, offers the advantage that it can be used in the same manner as a conventional toilet. In principle however, it is designed as a dry toilet only or in other words as a toilet, which simply directs the urine into the ground and does not collect it for further processing. The faeces are simply directed downwards via a downpipe. If flushing would be implemented, which is not provided for since it is a dry toilet, it would likewise mostly flow out via the secondary outlet, which is undesirable for further processing of concentrated urine. Additionally the annular groove is difficult to clean because of its size and position. If the user has diarrhoea for example, this construction would likewise result in a large part of the faeces passing into the secondary outlet and contaminate it or, in the worst case, block it.

Summary of the Invention

The object of the present invention is thus to create a separation toilet, which enables a concentrated discharge and collection of urine via a secondary outlet, wherein the toilet can be used either as a dry toilet, a vacuum toilet or a flushing toilet. The toilet should be usable in exactly the same manner as a conventional toilet and simple cleaning should be possible.

According to the present invention this object is achieved when the intake opening of the secondary outlet is positioned on one side of the vertical side wall of the pipe section and is thus positioned below the bowl and above the odour seal, and wherein the transition section between the upper edge of the intake opening of the secondary outlet and the vertical side wall of the pipe section is rounded. The discharge thus does not take place around the lower end of the downpipe, but only in that area where the majority of the urine flows in the case of conventional use. Here, the so-called teapot effect is put to use, in which, based on different criteria such as air pressure, flow velocity, surface tension of the liquid as well as the geometry and nature of the material, the urine flow adheres and is deflected into the intake opening of the secondary outlet. Air pressure and surface tension of the liquid are in this case predetermined. Likewise, the material properties are usually ceramic or stainless steel with comparable properties. The flow rate is also within a manageable range due to the amount of liquid produced when urinating. The factor to be selected by a person skilled in the art is consequently the choice of the appropriate geometry of the bowl and the position of the intake opening of the secondary outlet in order to achieve an effective diversion of the urine flow. The intake opening is located directly below the bowl and above a usually present odour seal, as a result of which said intake opening can be easily cleaned and can be provided for a plurality of different toilet types and sewage connections. The degree of the rounding can be selected depending on the height and design of the toilet and of the corresponding pipe section, so that a large part of the urine is directed into the intake opening at the side wall due to the surface tension of the liquid and the associated adhesion on the side wall. It is also possible to provide a flushing system, which is intended to flow out mainly via the main outlet. An additional advantage is that no complex installations, such as valve controls, sensors or the like, are required. The production costs are thus not higher than in the case of a conventional toilet and the cleaning is equally simple. Since no additional valves or the like are required, there is also no special maintenance effort necessary compared to conventional toilets.

It is a further feature of the present invention that the intake opening of the secondary outlet is positioned centrally on the front vertical side wall of the pipe section. This is the most common position for squat toilets as well as for sitting toilets where all users are positioned in the same way. In these cases the urine flows via the front area of the bowl towards the pipe section and thus also over the side wall section where the intake opening of the secondary outlet is positioned, as a result of which the urine is guided into the intake opening due to the surface tension of the liquid clinging to the side wall. Children who use a conventional sitting toilet tend to sit closer to the front edge of the bowl, which in the case of the invention also leads to a correct discharge of the urine, while the faeces enter the main outlet correctly even in this sitting position.

According to one possible embodiment, it is provided that the odour seal is formed by a pivotable cover. This type of odour seal is not the most common in toilets which are connected to a sewage system, but can provide additional advantages if, for example, a recycling system for the flushing water should be provided.

According to an additional advantageous feature, it can be provided that a separate flushing water outlet is arranged, and that the pivotable cover is connected to a control, so that the main outlet or the flushing water outlet can be opened selectively. By means of providing the cover and an additional control, it is also possible to distinguish if faeces are present or not. Accordingly, for example, a large part of the flushing water can be recycled if no faeces are introduced, or otherwise faeces and flushing water will be directed into the main outlet.

According to an alternative embodiment, it is provided that the odour seal is formed by a siphon, wherein the upper edge of a drain pipe located downstream of the siphon is arranged lower than the lower edge of the intake opening of the secondary outlet. This is the most frequent variant of an odour seal in toilets which are connected to a sewage system. In this case, a water column is present within the siphon and thus prevents odours from passing out of the drain pipe. Since the upper edge of the drain pipe is positioned below the lower edge of the intake opening of the secondary outlet, the water within the siphon can never reach up to the secondary outlet, as a result of which a faulty discharge of the water via the urinal outlet is avoided.

It is a further advantageous feature that at least two flushing water inlet openings are arranged next to one another in the bowl, through which openings the flushing water can be introduced into the bowl in substantially opposite lateral tangential directions, wherein the flow rate of the two flushing water inlet openings differs in such a manner, that the two opposite flushing water streams meet at the upper end of the pipe section at a side wall section adjacent to and/or facing away from the intake opening of the secondary outlet. Common toilet flushing systems distribute a flushing water stream into a cavity that is mounted around the edge of the toilet bowl, which cavity has a plurality of downwardly directed openings, so that a uniform flushing water curtain is formed over the entire wall area of the toilet bowl. In the case of a separating toilet according to the present invention, this would cause at least a part of the flushing water to enter into the secondary outlet due to the surface tension of the fluid, which is undesirable. In order to implement a toilet bowl which is easy to clean without overhanging edge regions specific flushing systems for so-called "rimless" toilet bowls have been developed in recent years. These flushing systems provide a flushing water inlet mounted in the rear upper area of the toilet bowl, which divides the flushing water streams tangentially to the sides and optionally directly downwards. The two tangential flushing water streams run towards one another along the walls of the bowl and meet one another in the front region of the bowl, swirl together at this point and run down into the outflow region. These flushing systems would therefore likewise direct a large part of the flushing water into the secondary outlet. For this reason, in a preferred embodiment according to the above-mentioned feature, the two tangential flushing water streams which run towards one another are introduced asymmetrically, as a result of which one of the two streams with a bigger flow volume runs past the front region of the bowl and finally meets the weaker opposite flushing water stream on the side of the bowl. As a consequence the swirling point is not located above the secondary outlet and the majority of the flushing water is consequently discharged on a side wall of the pipe section, which lies next to the intake opening of the secondary outlet. Thus, hardly any flushing water flows into the secondary outlet, and the concentrated urine can therefore be used for further processing.

According to a possible advantageous embodiment, it is provided that, starting from the bottom of the bowl in the section above the intake opening for the secondary outlet, a projection in the form of an overhang is formed above the intake opening. The overhang is advantageous for the loss of adhesion of the flushing water above the secondary outlet, but prevents the loss of adhesion of a urine flow, which leads to a more effective separation of the urine. Another advantage of the projection is that the entrance opening of the secondary outlet is less visible due to the overhang.

In an alternative advantageous embodiment, it is provided that in the bottom of the bowl there is a central, lower, stepped section, wherein the edges of the two steps laterally bordering the section are arranged to come closer to each other in the direction of the main outlet. Because of the downward-stepped section in the bottom of the bowl, the impacting urine flow is guided by the side steps in the direction of the intake opening of the secondary outlet. Depending on the design of the bowl, the laterally bordering steps can be straight or also arched in order to ideally guide the urine flow in the direction of the intake opening.

Finally, it is a further advantageous feature that the distance between the edges of the two steps laterally bordering the section at their end closest to the main outlet is at at most the width of the intake opening, and wherein the edges are aligned symmetrically towards the entrance opening. In order for the urine flow to be separated off as completely as possible via the secondary outlet, it is advantageous if the edges of the stepped section which are closest to the outlet end close to the upper area of the secondary outlet. The distance between the two edges at this end can consequently correspond to a maximum of the width of the intake opening of the secondary outlet, or can be made smaller, so that no portion of the urine flow is directed sideways past the intake opening.

BRIEF DESCRIPTION OF THE DRAWINGS

The invention will now be described in greater detail on the basis of exemplary embodiments and with the aid of the accompanying drawings.

DETAILED DESCRIPTION OF THE INVENTION

Figure 1:
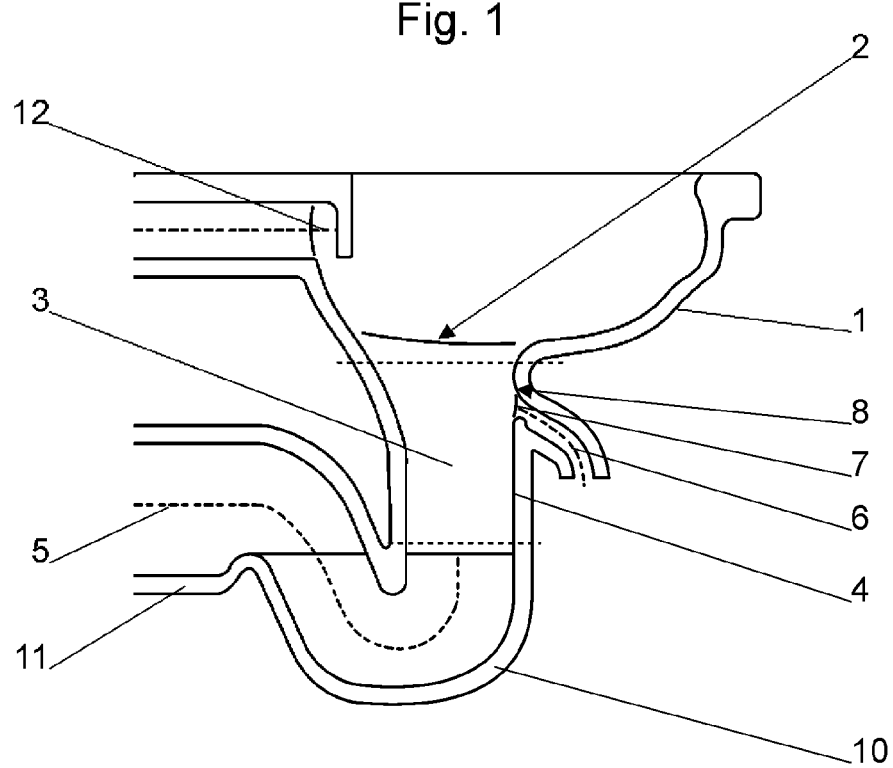
FIG. 1 shows a schematic sectional view of a first embodiment of a separating toilet according to the invention.

The schematic illustration of a possible embodiment of a toilet according to the invention which is shown in FIG. 1 comprises a bowl 1, at the lowest point of which the outflow region 2 is located. Here, the bowl 1 merges into a pipe section 3, the pipe section 3 being indicated by dotted lines. The pipe section 3 has side walls 4 which are at least in some sections vertical. An odour seal is located at the lower end of the pipe section 3, which according to the embodiment shown in FIG. 1 is formed by a siphon 10. The main outlet 5, which is formed here by a drain pipe 11, is located downstream of the siphon 10.

An intake opening 7 of a secondary outlet 6 is arranged in the front vertical side wall 4 of the pipe section 3. With regard to the toilet, "front" describes that side which is to be viewed as the front by a user sitting thereon, while "rear" generally describes the side of the toilet facing the wall. The intake opening 7 is flush with the respective side wall 4, wherein the transition area 8 between the upper edge of the intake opening 7 and the side wall 4 is rounded. The urine hitting the front region of the bowl during use is guided due to the surface tension of the liquid along the walls of the bowl 1 and the side walls of the pipe section 3 to the intake opening 7 and finally into the secondary outlet 6, and can thus be discharged separately in concentrated form and used for further processing. In the embodiment according to FIG. 1, a flushing water inlet opening 12 is also shown, wherein said opening is discussed in more detail with regard to FIG. 3.

Figure 2:
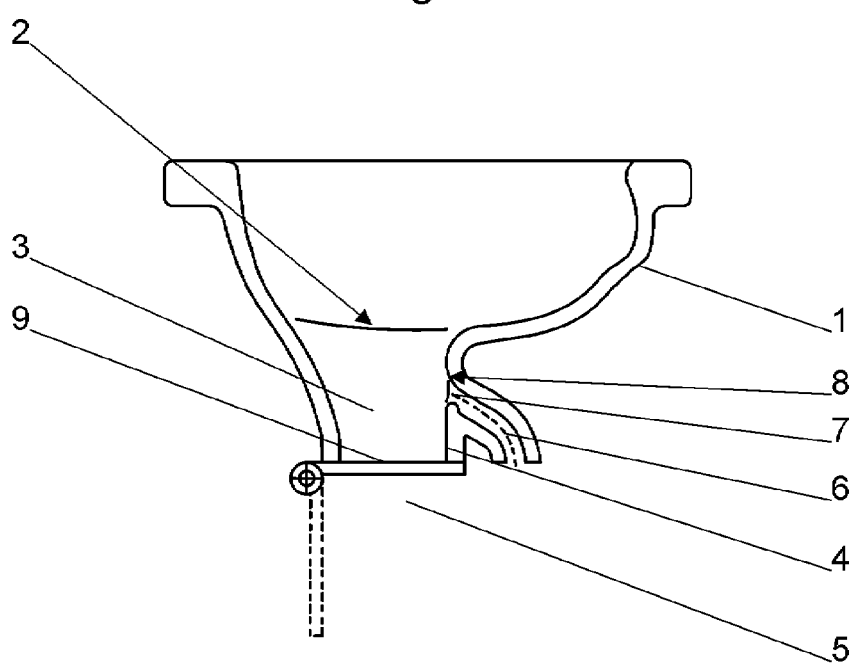
FIG. 2 shows a schematic sectional view of an alternative embodiment of a separating toilet according to the invention.

FIG. 2 shows an embodiment in which the odour seal is formed by a pivotable cover 9. The design of the secondary outlet 6 is the same, as in the embodiment of FIG. 1. The pivotable cover 9 can be used, for example, in a dry toilet, or an additional flushing water recycling system (not shown) can be implemented, in which case the cover 9 will be connected to a control system, in order to direct the flushing water to be reused or guide it together with faecal matter into the main outlet 5 depending on the usage of the toilet.

Figure 3:
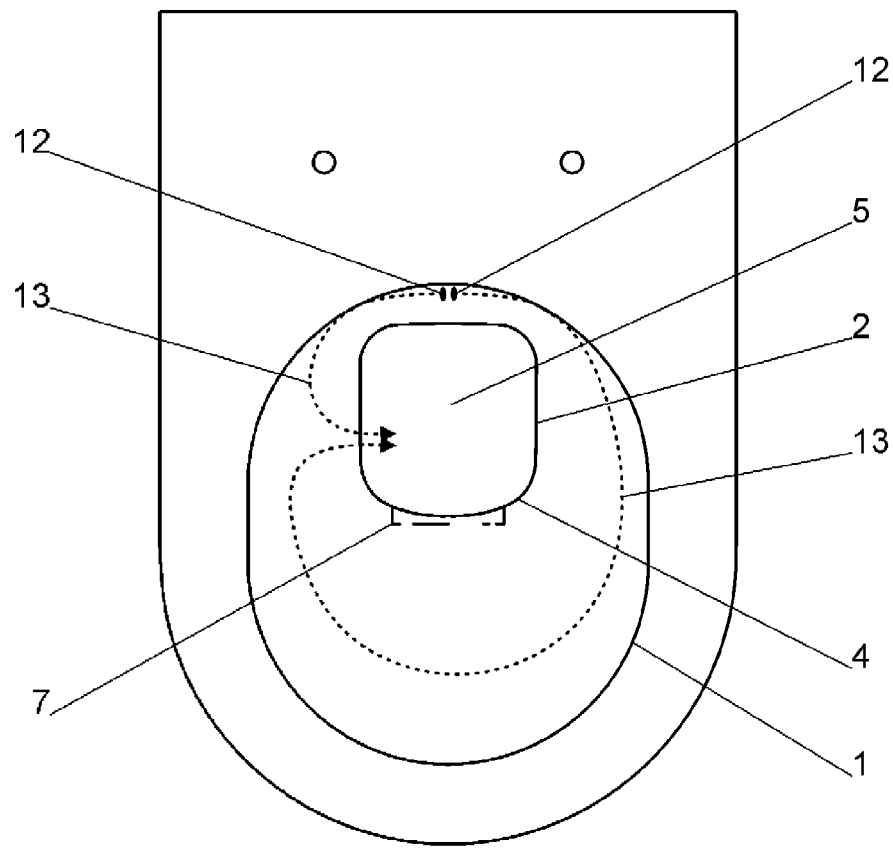
FIG. 3 shows a perspective sectional view of a separating toilet according to the invention with marked flushing water streams.

In FIG. 3, the flushing water inlet openings 12 and the flushing water streams 13 discharged therefrom are illustrated in greater detail. The embodiment shown here is a so-called "rimless" toilet, which is particularly easy to clean due to the lack of a cavity at the upper edge of the toilet bowl 1. The flushing water inlet openings are located in the rear upper area of the bowl 1. A portion of the flushing water is guided straight downwards in the direction of the pipe section 3, while two flushing water streams 13 are guided laterally along the toilet bowl walls tangentially in opposite directions. The two tangential inlet openings 12 are formed asymmetrically, which causes the flow volume to differ and thus the two flushing water streams 13 do not meet precisely at the front region of the bowl 1, but laterally offset to this region. The stronger flushing water stream 13 is thus guided past the front side of the bowl, without entering the outflow region 2 there and only afterwards meets the oncoming flushing water stream 13 from the other side and both continue downwards together. As a result, the majority of the flushing water is guided past the intake opening 7 of the secondary outlet 6 and thus, as desired, is discharged via the main outlet 5.

Figure 4:
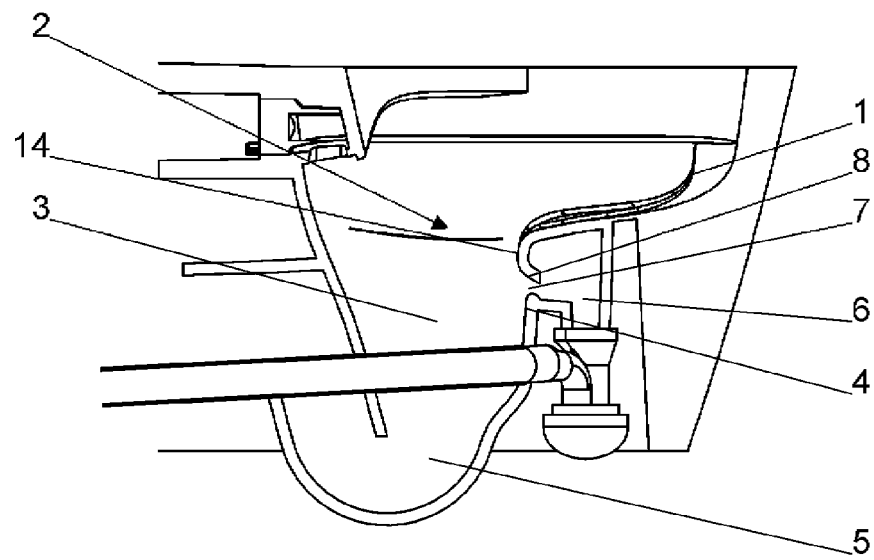
FIG. 4 shows a schematic sectional view of an alternative embodiment with an overhang above the intake opening.

In the embodiment shown in FIG. 4, a protrusion 14, which provides an overhang, is formed from the bottom of the bowl 1 in the direction of the outflow region 2 in the section above the intake opening 7 for the secondary outlet 6. Due to the surface tension of the liquid, the urine flow, which runs over the bottom of the bowl at a low speed, is guided over this overhang and easily reaches the intake opening 7 of the secondary outlet 6. The flushing water flow, on the other hand, which flows off at a significantly higher speed, tears off from the wall at the overhang and almost completely reaches the main outlet 5. The projection 14 also has the advantage that it optically covers the intake opening 7 of the secondary outlet 6 and thus makes it more difficult to see. This provides design advantages, since a separation toilet according to the invention can hardly be distinguished from a conventional toilet.

Figure 5:
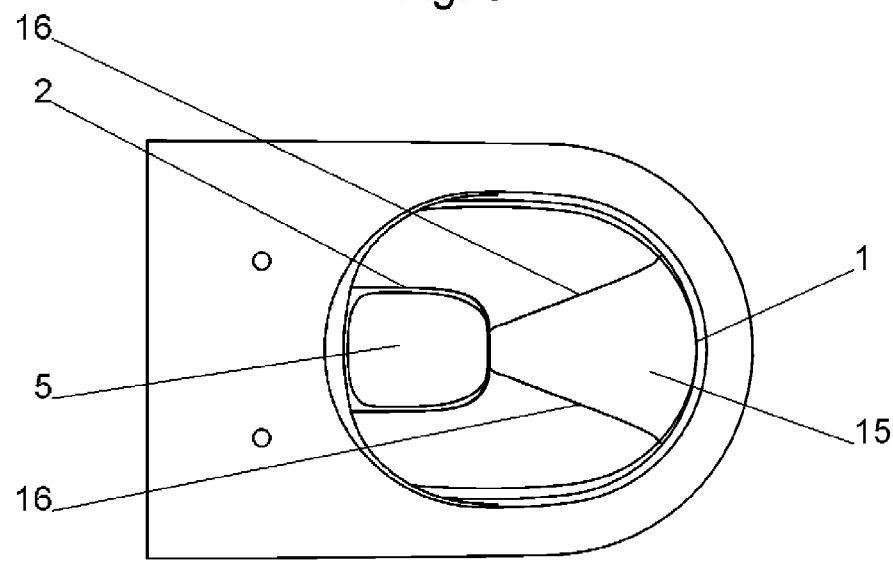
FIG. 5 shows a schematic view of an alternative embodiment with a central, lower-lying stepped section.

FIG. 5 shows another preferred feature of a possible embodiment of a separation toilet according to the invention. Here, a central, lower-lying, stepped section 15 is provided on the bottom of the bowl 1. The lateral edges 16 of the two steps bordering the section 15 are arranged to come close towards each other in the direction of the main outlet 5. The two steps thus form a guiding device for the urine flow, which guides it completely towards the intake opening 7 of the secondary outlet 6.

Figure 6:
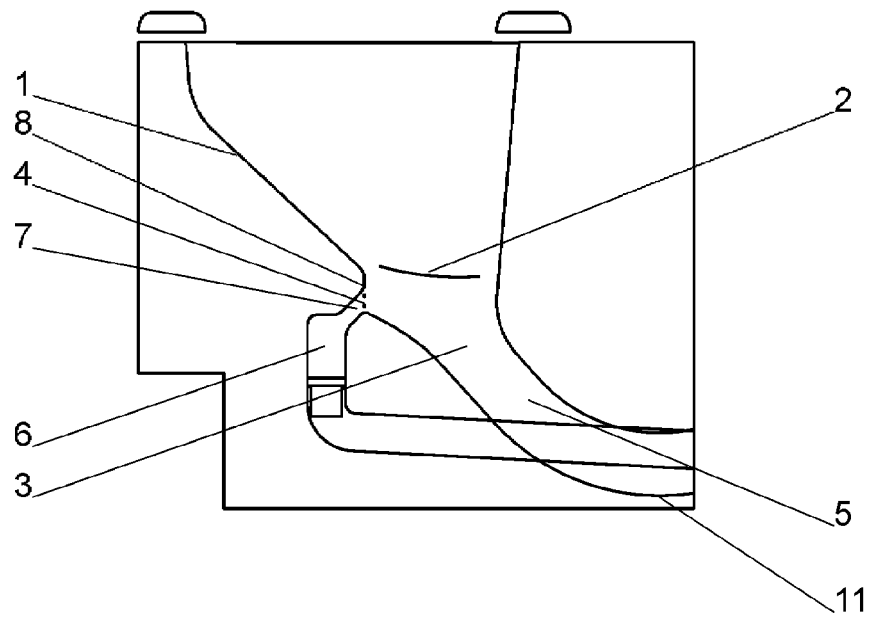
FIG. 6 shows a schematic view of a further embodiment with a largely inclined positioned main outlet.

FIG. 6 schematically shows a further possible embodiment of a separation toilet according to the invention. The bowl 1 has a shape which is common, for example, for many vacuum toilets. The bottom of the bowl is inclined at a similar angle of inclination as the adjoining pipe section 3 to the main outlet 5. The side wall of the pipe section 3 around the intake opening 7 of the secondary outlet 6 is the only area where the side wall is vertical in order to be able to bring about the necessary separation of the urine flow and to avoid that other wastewater or faeces get into the secondary outlet 6. It is therefore not necessary for the entire pipe section 3 to be designed vertically, but for the most part it can be based on the customary shapes for the respective type of toilet. The vertical section of the side wall is only necessary for the area of the intake opening 7 of the secondary outlet 6.

The invention claimed is:

1. A separation toilet comprising a bowl having a pipe section which is connected to an outflow region of the bowl and which pipe section has side walls that are at least partially vertical, and having a main outlet which is connected downstream of the pipe section, wherein an odor seal is provided between the pipe section and the main outlet, and wherein at least one separate secondary outlet for the separation of urine is provided, wherein the intake opening of the secondary outlet is positioned on one side of the vertical side wall of the pipe section and is thus positioned below the bowl and above the odor seal, and wherein the transition section between the upper edge of the intake opening of the secondary outlet and the vertical side wall of the pipe section is rounded.

2. The separation toilet according to claim 1, wherein the intake opening of the secondary outlet is positioned centrally on the front vertical side wall of the pipe section.

3. The separation toilet according to claim 1, wherein the odor seal is formed by a pivotable cover.

4. The separation toilet according to claim 3, wherein a separate flushing water outlet is provided, and that the pivotable cover is connected to a control, so that the main outlet or the flushing water outlet can be opened selectively.

5. The separation toilet according to claim 1, wherein the odor seal is formed by a siphon, wherein the upper edge of a drain pipe located downstream of the siphon is arranged lower than the lower edge of the intake opening of the secondary outlet.

6. The separation toilet according to claim 1, wherein at least two flushing water inlet openings are arranged next to one another in the bowl, through which openings the flushing water can be introduced into the bowl in substantially opposite lateral tangential directions, wherein the flow rate of the two flushing water inlet openings differs in such a manner, that the two opposite flushing water streams meet at the upper end of the pipe section at a side wall section adjacent to and/or facing away from the intake opening of the secondary outlet.

7. The separation toilet according to claim 1, wherein starting from the bottom of the bowl in the section above the intake opening for the secondary outlet, a projection is formed in the form of an overhang above the intake opening.

8. The separation toilet according to claim 1, wherein in the bottom of the bowl there is a central, lower, stepped section, wherein the edges of the two steps laterally bordering the section are arranged to come closer to each other in the direction of the main outlet.

9. The separation toilet according to claim 8, wherein the distance between the edges of the two steps laterally bordering the section at their end closest to the main outlet is at most the width of the intake opening, and wherein the edges are aligned symmetrically towards the entrance opening.

* * * * *